United States Patent
Yoon

(10) Patent No.: US 7,835,707 B2
(45) Date of Patent: Nov. 16, 2010

(54) MULTI-BAND ANTENNA UNIT OF MOBILE TERMINAL

(75) Inventor: Seong Ho Yoon, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 632 days.

(21) Appl. No.: 11/709,351

(22) Filed: Feb. 21, 2007

(65) Prior Publication Data
US 2008/0096492 A1    Apr. 24, 2008

(30) Foreign Application Priority Data
Oct. 20, 2006    (KR)    ........... 10-2006-0102346

(51) Int. Cl.
*H04B 1/44* (2006.01)
(52) U.S. Cl. ............. 455/78; 455/101; 455/562.1; 455/63.3; 455/575.7; 343/702; 343/704; 343/846; 343/895
(58) Field of Classification Search ............. 455/78, 455/101, 562.1, 63.3, 63.4, 575.6, 575.7; 343/702, 704, 895, 846
See application file for complete search history.

(56) References Cited

U.S. PATENT DOCUMENTS

| | | | | |
|---|---|---|---|---|
| 5,715,525 | A * | 2/1998 | Tarusawa et al. | 455/101 |
| 5,905,467 | A * | 5/1999 | Narayanaswamy et al. | 343/702 |
| 6,115,585 | A * | 9/2000 | Matero et al. | 455/78 |
| 6,211,830 | B1 * | 4/2001 | Monma et al. | 343/702 |
| 6,560,443 | B1 * | 5/2003 | Vaisanen et al. | 455/73 |
| 6,714,773 | B1 * | 3/2004 | Ishida | 455/272 |
| 7,113,129 | B2 * | 9/2006 | Goldberg | 342/378 |
| 7,116,271 | B2 * | 10/2006 | Kostanic et al. | 342/378 |
| 7,155,184 | B2 * | 12/2006 | Kim | 455/205 |
| 7,180,453 | B2 * | 2/2007 | Nakagawa et al. | 343/702 |
| 7,239,889 | B2 * | 7/2007 | Saari et al. | 455/552.1 |
| 7,366,473 | B2 * | 4/2008 | Lin et al. | 455/63.4 |
| 7,411,557 | B2 * | 8/2008 | Shimizu et al. | 343/702 |
| 7,486,189 | B2 * | 2/2009 | Koerner et al. | 340/572.1 |
| 7,542,750 | B2 * | 6/2009 | Zahm | 455/277.2 |
| 2007/0042725 | A1 * | 2/2007 | Poilasne et al. | 455/101 |

FOREIGN PATENT DOCUMENTS

| | | |
|---|---|---|
| JP | 08-222926 | 8/1996 |
| JP | 2000-059275 | 2/2000 |
| KR | 1020040061742 | 7/2004 |

\* cited by examiner

*Primary Examiner*—Marceau Milord
(74) *Attorney, Agent, or Firm*—The Farrell Law Firm, LLP

(57) ABSTRACT

Disclosed is a multi-band antenna unit of a mobile terminal that includes an antenna, switch, sensor, first matching circuit, second matching circuit, diplexer, first signal processing unit, and second signal processing unit. The antenna is movably installed between first and second contacts, and transmits and receives first and second signals of different frequency bands. The switch connects the first contact to the first matching circuit or the second contact through the second matching circuit. The sensor detects an antenna position, and allowing selective connection of first or second matching circuits. Transmission and reception of multiple signals of various frequency bands is enabled using a single antenna unit, reducing the number of components, cost, and size of a mobile terminal. Additionally, performance of an antenna is improved by connecting to a proper matching circuit according to the position of the antenna.

14 Claims, 4 Drawing Sheets

MULTI-BAND ANTENNA UNIT OF MOBILE TERMINAL

PRIORITY

This application claims priority to an application entitled "MULTI-BAND ANTENNA UNIT OF MOBILE TERMINAL" filed in the Korean Intellectual Property Office on Oct. 20, 2006, and assigned Serial No. 2006-0102346, the contents of which are incorporated herein by reference.

BACKGROUND OF THE INVENTION

1. Field of the Invention

The present invention relates to an antenna unit of a mobile terminal, and, more particularly, to a multi-band antenna unit of a mobile terminal.

2. Description of the Prior Art

A mobile terminal is an electronic device enabling free wireless and short-range network communication with little restriction of time and place. The mobile terminal must have an antenna unit for effective communication.

Recently developed mobile terminals have a Bluetooth function, Digital Multimedia Broadcasting (DMB) function, and Radio Frequency IDentification (RFID) function in addition to their basic mobile communication function of telephone conversation.

Mobile terminals capable of receiving Terrestrial Digital Multimedia Broadcasting (T-DMB) service require a long antenna, because a T-DMB system uses a signal of a low frequency band (200 MHz). In this case, a retractable antenna is used for better portability of the mobile terminal. Mobile terminals capable of receiving Satellite Digital Multimedia Broadcasting (S-DMB) service utilize a diversity antenna unit. The diversity antenna unit includes an antenna integrated in the mobile terminal and a detachable external antenna for use in a weak radio field.

The RFID system is a non-contact identification system that processes information about a commodity (or product) and its surroundings via a radio frequency wave and a small chip that is attached to the commodity. The RFID system includes an RFID tag for storing data, a reader for retrieving data from the RFID tag, and an antenna for data transmission between the RFID tag and the reader. In the RFID system, a read range becomes a very importance factor, and a long antenna must be used for a longer read range.

A conventional mobile terminal must be equipped with several antennas for execution of mobile communication, DMB reception, and RFID functions corresponding to individual frequency bands. Therefore, the conventional mobile terminal has a disadvantage of increased size and weight.

In addition to the DMB and RFID functions, various functions, such as wireless Internet communication and GPS communication, are added to the mobile terminal, and accordingly the frequency band of each function becomes narrower and the number of frequency bands used by a mobile terminal is increasing.

To solve the above problems, several antennas have been developed to cover various frequency bands with a single antenna. However, development of an antenna circuit enabling effective transmission of signals in various frequency bands has not yet been successful.

SUMMARY OF THE INVENTION

The present invention has been made in view of the above problems, and an object of the present invention is to provide a circuit of an antenna unit enabling effective transmission and reception of signals having a plurality of frequency bands with a single antenna, when executing mobile communication, DMB reception, and RFID functions.

Another object of the present invention is to improve performance of a mobile terminal antenna by using a proper antenna circuit.

Yet another object of the present invention is to reduce costs and size of a mobile terminal by reducing the number of components required for an antenna circuit.

In order to achieve the above objects, a multi-band antenna unit of a mobile terminal according to the present invention includes an antenna, switch, diplexer, first signal processing unit, and second signal processing unit. The antenna is movably installed between a first contact and a second contact, and transmits and receives a first signal and a second signal having different frequency bands from each other. The switch is selectively connected to the first contact through a first path or to the second contact through a second path. The diplexer is connected to the switch and separates the first signal and the second signal. The first and second signal processing units are connected to the diplexer.

The multi-band antenna unit preferably further includes a first matching circuit and a second matching circuit in the first path and in the second path, respectively.

The multi-band antenna unit further preferably includes a sensor connected to the first contact for detecting the position of the antenna and controlling the switch.

In the multi-band antenna unit, the first signal and the second signal may be an RFID signal and a T-DMB signal, respectively.

The multi-band antenna unit may further include an auxiliary antenna connected to the second signal processing unit, wherein the first signal and the second signal are an RFID signal and a T-DMB signal, respectively.

A multi-band antenna unit of a mobile terminal according to another embodiment of the present invention includes a first antenna, first branch, second branch, duplexer, first signal processing unit, diplexer, second signal processing unit, and third signal processing. The first antenna is movably installed between a first contact and a second contact, and transmits and receives a first signal, second signal, and third signal having different frequency bands from each other. The first branch is connected to the first contact, and the second branch is connected to the second contact and the first branch. The duplexer is connected to the first branch, and the first signal processing unit is connected to the duplexer. The diplexer is connected to the second branch and separates the second signal and the third signal. The second and third signal processing units are connected to the diplexer.

The multi-band antenna unit preferably further includes a switch and a second antenna. The switch is disposed between the first branch and the duplexer, and selectively connects to the first branch or to the second antenna. The second antenna is connected to the switch, and transmits and receives the first signal.

The multi-band antenna unit further preferably includes a sensor connected to the first contact, for detecting the position of the first antenna and controlling the switch.

The multi-band antenna unit yet further preferably includes a band reject filter disposed between the second branch and the diplexer.

In the multi-band antenna unit, the first signal, second signal, and third signal may be a mobile communication signal, RFID signal, and DMB signal, respectively.

A multi-band antenna unit of a mobile terminal according to another embodiment of the present invention includes a first antenna, first switch, branch, second antenna, second switch, first signal processing unit, band reject filter, diplexer, duplexer, second signal processing unit, and third signal processing unit. The first antenna is movably installed between a first contact and a second contact, and transmits and receives a first signal, second signal, and third signal having different frequency bands from each other. The first switch is selectively connected to the first contact or to the second contact. The branch is connected to the first switch and the band reject filter. The second antenna transmits and receives the first signal. The second switch is selectively connected to the branch or to the second antenna. The duplexer is connected to the second switch and the first signal processing unit. The band reject filter is connected to the branch. The diplexer is connected to the band reject filter, and separates the second signal and the third signal. The second and third signal processing units are connected to the diplexer.

The multi-band antenna unit further preferably includes a first matching circuit disposed between the first contact and the first switch, and a second matching circuit disposed between the second contact and the first switch.

The multi-band antenna unit preferably further includes a sensor connected to the first contact, first switch, and second switch. The sensor detects the position of the first antenna, and controls the first switch and the second switch.

BRIEF DESCRIPTION OF THE DRAWINGS

The above and other objects, features and advantages of the present invention will become more apparent from the following detailed description in conjunction with the accompanying drawings, in which.

DETAILED DESCRIPTION OF PREFERRED EMBODIMENTS

Hereinafter, preferred embodiments of the present invention are described in detail with reference to the accompanying drawings. The same reference numbers are used throughout the drawings to refer to the same or like parts. Detailed descriptions of constructions or processes known in the art may be omitted to avoid obscuring the subject matter of the present invention.

Figure 1:
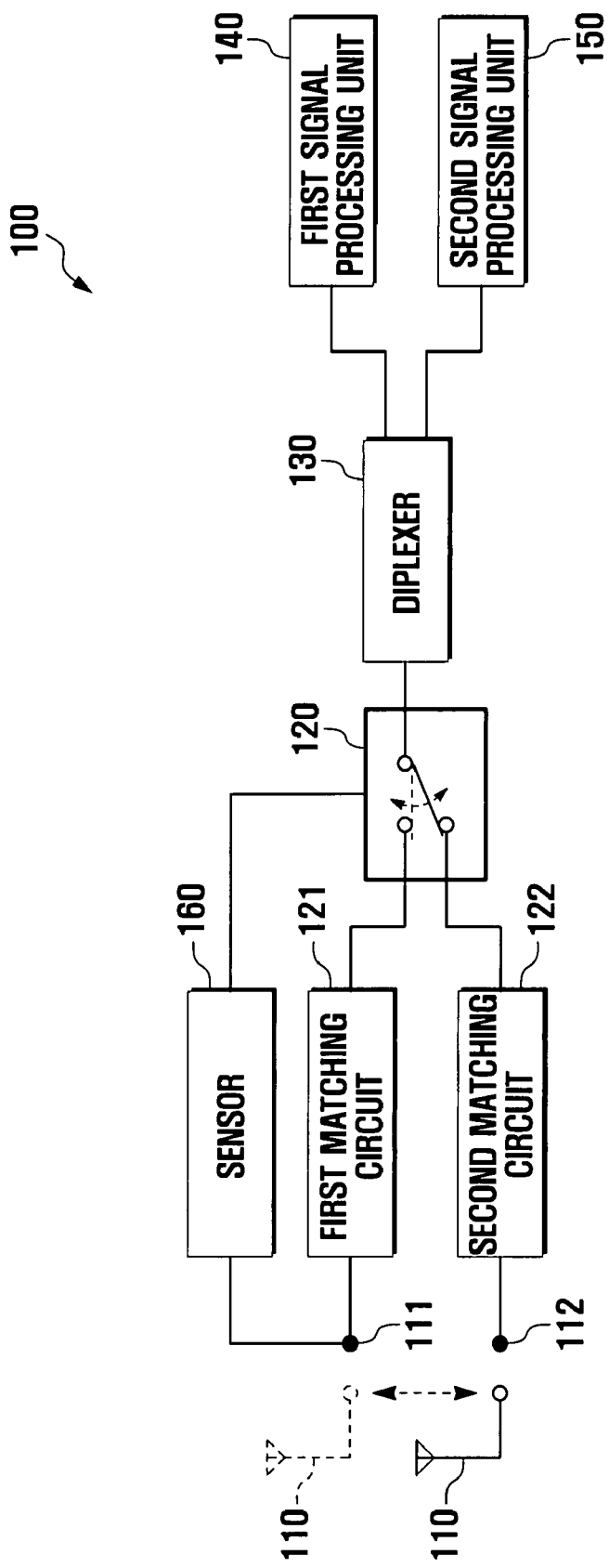
FIG. 1 is a block diagram showing a configuration of an antenna unit of a mobile terminal according to an embodiment of the present invention.

FIG. 1 is a block diagram showing a configuration of an antenna unit 100 of a mobile terminal according to the present invention. Referring to FIG. 1, the antenna unit 100 of the mobile terminal includes an antenna 110, switch 120, diplexer 130, first signal processing unit 140, second signal processing unit 150, and sensor 160.

The antenna 110 may transmit and receive a first signal and a second signal having different frequency bands from each other. The first signal is an RFID signal having a frequency band of 900 MHz, and the second signal is a T-DMB signal having a frequency band of 200 MHz. When the mobile terminal is located in an area providing a strong radio field, the antenna 110 may be used in a state of being inserted within the mobile terminal, and thereby appearance of the mobile terminal is improved. However, when the mobile terminal is located in an area providing a weak radio field, the antenna may be used in a state of being extended outside of the mobile terminal, and thereby performance of the antenna is improved. When the antenna 110 is extended outside of the mobile terminal, the antenna is connected to a first contact 111. When the antenna is inserted into the mobile terminal, the antenna is connected to a second contact 112.

The first contact 111 is connected to the switch 120 through a first path. The second contact 112 is connected to the switch 120 through a second path. The switch 120 selects one of the first path and the second path. The first path and the second path include a first matching circuit 121 and a second matching circuit 122, respectively. The matching circuits 121 and 122 are selected to provide optimum impedance corresponding to the first path and the second path, respectively. Performance of the circuit may be improved by selecting a proper matching circuit.

The antenna unit 100 includes a sensor 160 connected between the first contact 111 and the switch 120. The sensor 160 detects the position of the antenna 110 by identifying whether the antenna 110 is connected to the first contact 111, and controls the switch 120 according to the position of the antenna 110. When the antenna 110 is located at the first contact 111, the switch 120 connects the diplexer 130 to the first path. When the antenna 110 is located at the second contact 112, the switch 120 connects the diplexer 130 to the second path.

The switch 120 is connected to the diplexer 130. The diplexer 130 includes a low pass filter and a high pass filter, and separates an RFID signal and a T-DMB signal according to their frequency bands. The separated RFID signal is transmitted to the first signal processing unit 140 and the separated T-DMB signal is transmitted to the second signal processing unit 150.

The first and second signal processing units 140 and 150 process the received signal to be used by the mobile terminal. For example, an RFID signal processing unit includes a directional coupler, power amplifier, and RF identification processing unit, and converts the received RFID signal properly for the mobile terminal.

Hereinafter, a method of operation of the antenna unit according to the present invention is described in detail.

The sensor 160 detects the position of the antenna 110 by identifying whether the antenna 110 is connected to the first contact 111. If the antenna 110 is located at the first contact 111, the sensor controls the switch 120 to connect the diplexer 130 to the first matching circuit 121. If the antenna 110 is not located at the first contact 111, the sensor controls the switch 120 to connect the diplexer 130 to the second matching circuit 122.

Figure 2:
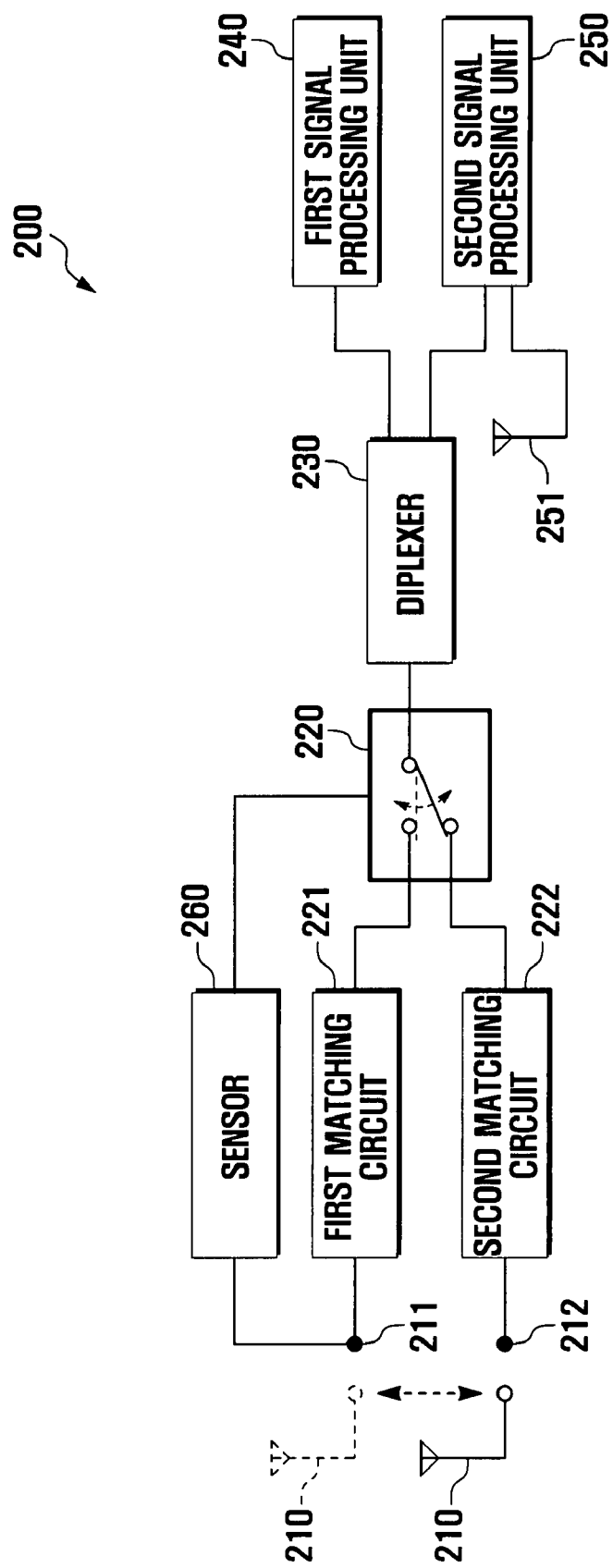
FIG. 2 is a block diagram showing a configuration of an antenna unit of a mobile terminal according to another embodiment of the present invention.

The antenna 110 receives an RFID signal and a T-DMB signal. The received signal is transmitted to the diplexer 130 through a matching circuit 121 or 122. The diplexer 130 separates the RFID signal and the T-DMB signal, and transmits the separated signals to the first signal processing unit 140 and the second signal processing unit 150, respectively. FIG. 2 is a block diagram showing a configuration of an antenna unit 200 of a mobile terminal according to another embodiment of the present invention. In the present invention, a first signal and a second signal are an RFID signal and an S-DMB signal, respectively. The antenna unit 200 includes components similar to the antenna unit 100 shown in FIG. 1, except that a second signal processing unit 250 further includes an auxiliary antenna 251. Therefore, detailed descriptions of components similar to those of FIG. 1 are omitted.

Referring to FIG. 2, the second signal processing unit 250 is connected to a diplexer 230 and the auxiliary antenna 251. The auxiliary antenna 251 is used for receiving S-DMB signals when the mobile terminal 200 is located in an area providing a weak radio wave field. The second signal processing unit 250 receives the S-DMB signals both from the diplexer 230 and from the auxiliary antenna 251, and selects the stronger signal. That is, the antenna unit 200 operates as a diversity antenna unit.

Figure 3:
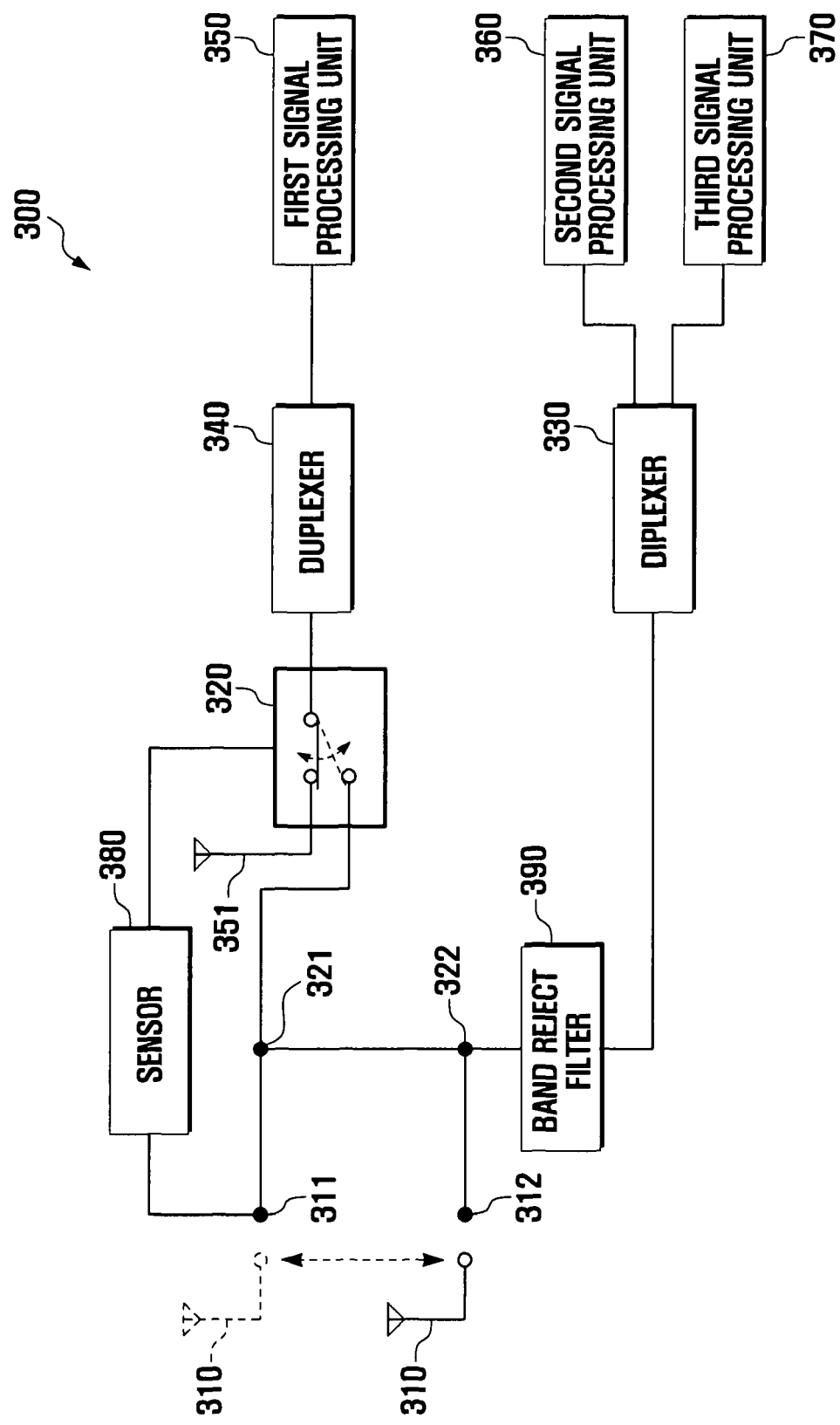
FIG. 3 is a block diagram showing a configuration of an antenna unit of a mobile terminal according to another embodiment of the present invention.

FIG. 3 is a block diagram showing a configuration of an antenna unit 300 of a mobile terminal according to another embodiment of the present invention. Referring to FIG. 3, the antenna unit 300 includes a first antenna 310, switch 320, diplexer 330, duplexer 340, first signal processing unit 350, second antenna 351, second signal processing unit 360, third signal processing unit 370, sensor 380, and band reject filter 390.

The first antenna 310 may receive a first signal, second signal, and third signal having different frequency bands from each other. The first signal, second signal, and third signal may be a mobile communication signal, RFID signal, and DMB signal, respectively. The mobile communication signal is a signal used for conversation through a mobile terminal. When the mobile terminal is located in an area providing a strong radio field, the antenna 310 may be used in a state of being inserted within the mobile terminal, and thereby the appearance of the mobile terminal is improved. However, when the mobile terminal is located in an area providing a weak radio field, the antenna 310 may be used in a state of being extended outside of the mobile terminal, and thereby the performance of the antenna 310 is improved. When the antenna 310 is extended outside of the mobile terminal 300, the antenna 310 is connected to a first contact 311. When the antenna 310 is inserted into the mobile terminal, the antenna 310 is connected to a second contact 312.

The first contact 311 is connected to a first branch 321. The first branch 321 joins the first signal processing unit 350, second signal processing unit 360, and third signal processing unit 370 together. The first branch 321 is connected to the first signal processing unit 350 through the switch 320, and is connected to the second signal processing unit 360 and the third signal processing unit 370 through a second branch 322.

The switch 320 is connected to the second antenna 351 transmitting and receiving the first signal. The switch 320 is connected also to the first contact 311 through the sensor 380. The sensor 380 identifies whether the first antenna 310 is connected to the first contact 311, and thereby detects the position of the first antenna 310. The switch 320 selectively connects to the first branch 321 or to the second antenna 351 according to the position of the first antenna 310. When the first antenna 310 is connected to the first contact 311, the switch 320 connects the duplexer 340 to the first branch 321. When the first antenna 310 is connected to the second contact 312, the switch 320 connects the duplexer 340 to the second antenna 351.

The switch 320 is connected to the duplexer 340 and the first signal processing unit 350. Because the duplexer 340 includes a band pass filter for passing frequency bands of mobile communication signals, only the mobile communication signal is transmitted to the first signal processing unit 350 by the duplexer 340.

The second branch 322 is connected to the second contact 312, first branch 321, and band reject filter 390. The band reject filter 390 is connected to the diplexer 330. The band reject filter 390 transmits only the RFID signal and DMB signal to the diplexer 330 by removing the mobile communication signal. The diplexer 330 transmits the RFID signal and the DMB signal, by separating them, to the second signal processing unit 360 and the third signal processing unit 370, respectively.

Hereinafter, an operation method of the antenna unit according to this embodiment of the present invention is described in detail.

The first antenna 310 transmits and receives a mobile communication signal, RFID signal, and DMB signal. If the first antenna 310 is extended outside of the mobile terminal, the first antenna 310 is connected to the first contact 311. The sensor 380 identifies that the first antenna 310 is connected to the first contact 311, and controls the switch 320 to connect the duplexer 340 to the first branch 321.

The three signals received through the first antenna 310 are transmitted from the first branch 321 to the switch 320 and the second branch 322. However, only the mobile communication signal is transmitted to the first signal processing unit 350 by the duplexer 340. Among the three signals transmitted to the second branch 322, the mobile communication signal is removed by the band reject filter 390, and only the RFID signal and DMB signal are allowed to pass. The passed RFID signal and DMB signal are separated by the diplexer 330, and transmitted to the second signal processing unit 360 and the third signal processing unit 370, respectively.

If the first antenna 310 is inserted within the mobile terminal, the first antenna 310 is connected to the second contact 312. The sensor 380 identifies that the first antenna 310 is not connected to the first contact 311, and controls the switch 320 to connect the duplexer 340 to the second antenna 351. Accordingly, a mobile communication signal received through the second antenna 351 is transmitted to the first signal processing unit 350 through the duplexer 340.

Among the signals received by the first antenna 310, the mobile communication signal is removed by the band reject filter 390, and only the RFID signal and DMB signal are allowed to pass. The passed RFID signal and DMB signal are separated by the diplexer 330, and transmitted to the second signal processing unit 360 and the third signal processing unit 370, respectively.

Figure 4:
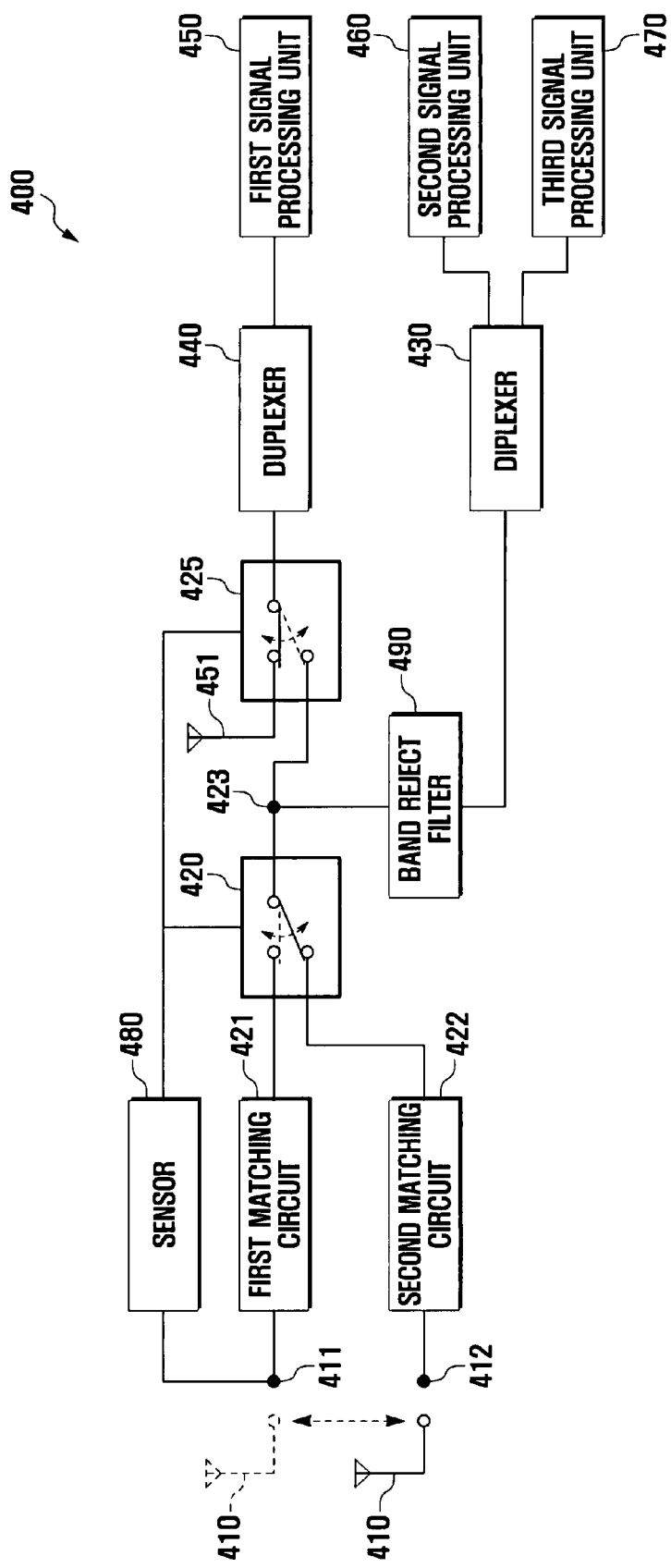
FIG. 4 is a block diagram showing a configuration of an antenna unit of a mobile terminal according to another embodiment of the present invention.

FIG. 4 is a block diagram showing a configuration of an antenna unit of a mobile terminal according to another embodiment of the present invention. Referring to FIG. 4, an antenna unit 400 this embodiment of the present invention includes a first antenna 410, first switch 420, first matching circuit 421, second matching circuit 422, second switch 425, diplexer 430, duplexer 440, first signal processing unit 450, second antenna 451, second signal processing unit 460, third signal processing unit 470, sensor 480, and band reject filter 490. In the description of an antenna unit 400, detailed descriptions of components similar to those of FIG. 3 are omitted.

The first switch 420 is connected to a first contact 411 through the first matching circuit 421 and to a second contact 412 through the second matching circuit 422. The matching circuits 421 and 422 are used for optimizing impedance corresponding to each path. The sensor 480 detects the position of the first antenna 410 and controls the first switch 420 and the second switch 425.

If the first antenna 410 is connected to the first contact 411, the sensor 480 controls the first switch 420 to connect a branch 423 to the first matching circuit 421, and controls the second switch 425 to connect the duplexer 440 to the branch 423. Accordingly, signals received through the first antenna 410 are transmitted to the duplexer 440 and the band reject filter 490 through the first matching circuit 421. A method of processing the signals is similar to that described in FIG. 3.

If the first antenna 410 is connected to the second contact 412, the sensor 480 controls the first switch 420 to connect the branch 423 to the second matching circuit 422 and controls the second switch 425 to connect the duplexer 440 to the second antenna 451. Accordingly, signals received through the first antenna 410 are transmitted to the band reject filter 490 through the second matching circuit 422. The duplexer 440 receives a mobile communication signal through the second antenna 451. A method of processing the signals is similar to that described in FIG. 3.

The mobile terminal according to the present invention includes portable electronic devices, such as a mobile phone, Personal Digital Assistant (PDA), Global Positioning System (GPS), navigator, DMB receiver, and Portable Multimedia Player (PMP).

Additionally, the antenna unit according to the present invention may transmit and receive various signals having different frequency bands from each other, such as an RFID signal, S-DMB signal, T-DMB signal, GSM (Global System for Mobile communication) signal, mobile communication signal, and Bluetooth signal.

The present invention enables effective transmission and reception of multiple signals of various frequency bands by using a single antenna unit. Accordingly, the number of components, costs, and size of a mobile terminal may be reduced. Additionally, performance of an antenna may be improved by connecting to a proper matching circuit according to the position of the antenna.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention, as defined in the appended claims.

What is claimed is:

1. A multi-band antenna unit for a mobile terminal, the multi-band antenna unit comprising:
   a single extendable antenna movable between a first contact and a second contact for transmitting and receiving a first signal and a second signal having different frequency bands from each other;
   a switch for selectively connecting to the first contact through a first path or to the second contact through a second path;
   a diplexer connected to the switch for separating the first signal and the second signal;
   a first signal processing unit connected to the diplexer; and
   a second signal processing unit connected to the diplexer, wherein when the single extendable antenna extends outside of the mobile terminal, the single extendable antenna is connected to the first contact, and when the single extendable antenna is inserted into the mobile terminal, the single extendable antenna is connected to the second contact.

2. The multi-band antenna unit of claim 1, wherein the first path and the second path comprise a first matching circuit and a second matching circuit, respectively.

3. The multi-band antenna unit of claim 1, further comprising a sensor connected to the first contact for detecting a position of the single extendable antenna and controlling the switch.

4. The multi-band antenna unit of claim 1, wherein the first signal and the second signal are an RFID (Radio Frequency IDentification) signal and a T-DMB (Terrestrial Digital Multimedia Broadcasting) signal, respectively.

5. The multi-band antenna unit of claim 1, further comprising an auxiliary antenna connected to the second signal processing unit.

6. The multi-band antenna unit of claim 5, wherein the first signal and the second signal are an RFID (Radio Frequency IDentification) signal and an S-DMB (Satellite Digital Multimedia Broadcasting) signal, respectively.

7. A multi-band antenna unit for a mobile terminal, the multi-band antenna unit comprising:
   a single extendable antenna movable between a first contact and a second contact, for transmitting and receiving a first signal, second signal and third signal having different frequency bands from each other;
   a first branch connected to the first contact;
   a second branch connected to the second contact and the first branch;
   a duplexer connected to the first branch;
   a first signal processing unit connected to the duplexer;
   a diplexer connected to the second branch for separating the second signal and the third signal;
   a second signal processing unit connected to the diplexer; and
   a third signal processing unit connected to the diplexer,
   wherein when the single extendable antenna extends outside of the mobile terminal, the single extendable antenna is connected to the first contact, and when the single extendable antenna is inserted into the mobile terminal, the single extendable antenna is connected to the second contact.

8. The multi-band antenna unit of claim 7, further comprising:
   a switch disposed between the first branch and the diplexer; and
   an additional antenna connected to the switch for transmitting and receiving the first signal;
   wherein the switch selectively connects to the first branch or the additional antenna.

9. The multi-band antenna unit of claim 8, further comprising a sensor connected to the first contact for detecting a position of the single extendable antenna and controlling the switch.

10. The multi-band antenna unit of claim 7, further comprising a band reject filter disposed between the second branch and the diplexer.

11. The multi-band antenna unit of claim 7, wherein the first signal, second signal, and third signal are a communication mobile signal, RFID (Radio Frequency IDentification), and DMB (digital multimedia broadcasting) signal, respectively.

12. A multi-band antenna unit for a mobile terminal, the multi-band antenna unit comprising:
   single extendable antenna movable between a first contact and a second contact, for transmitting and receiving a first signal, second signal and third signal having different frequency bands from each other;
   a first switch for selectively connecting to the first contact or the second contact;
   a branch connected to the first switch;
   a second antenna for transmitting and receiving the first signal;
   a second switch for selectively connecting to the branch or to the second antenna;
   a duplexer connected to the second switch;

a first signal processing unit connected to the duplexer;
a band reject filter connected to the branch;
a diplexer connected to the band reject filter for separating the second signal and the third signal;
a second signal processing unit connected to the diplexer; and
a third signal processing unit connected to the diplexer,
wherein when the single extendable antenna extends outside of the mobile terminal, the single extendable antenna is connected to the first contact, and when the single extendable antenna is inserted into the mobile terminal, the single extendable antenna is connected to the second contact.

13. The multi-band antenna unit of claim 12, further comprising:
   a first matching circuit disposed between the first contact and the first switch; and
   a second matching circuit disposed between the second contact and the first switch.

14. The multi-band antenna unit of claim 12, further comprising a sensor connected to the first contact, first switch and second switch, wherein the sensor detects a position of the first antenna and controls the first switch and the second switch.

* * * * *